(12) United States Patent
Munteanu

(10) Patent No.: US 11,886,895 B2
(45) Date of Patent: Jan. 30, 2024

(54) ENHANCED TARGET SELECTION FOR ROBOTIC PROCESS AUTOMATION

(71) Applicant: UiPath Inc., New York, NY (US)

(72) Inventor: Dan V. Munteanu, Bucharest (RO)

(73) Assignee: UiPath Inc., New York, NY (US)

( * ) Notice: Subject to any disclaimer, the term of this patent is extended or adjusted under 35 U.S.C. 154(b) by 0 days.

(21) Appl. No.: 18/305,467

(22) Filed: Apr. 24, 2023

(65) Prior Publication Data

US 2023/0259373 A1 Aug. 17, 2023

Related U.S. Application Data

(63) Continuation of application No. 17/816,415, filed on Jul. 31, 2022, now Pat. No. 11,635,977, which is a continuation of application No. 16/730,247, filed on Dec. 30, 2019, now Pat. No. 11,403,118.

(51) Int. Cl.
*G06F 9/44* (2018.01)
*G06F 9/451* (2018.01)
*G05B 13/02* (2006.01)
*G06N 3/08* (2023.01)
*G06N 5/025* (2023.01)

(52) U.S. Cl.
CPC ........ *G06F 9/451* (2018.02); *G05B 13/0265* (2013.01); *G06N 3/08* (2013.01); *G06N 5/025* (2013.01)

(58) Field of Classification Search
CPC ..................................................... G06F 9/451
USPC ..................................................... 718/100
See application file for complete search history.

(56) References Cited

U.S. PATENT DOCUMENTS

| | | | | |
|---|---|---|---|---|
| 7,627,821 | B2* | 12/2009 | Klementiev | ........ G06F 9/45512 715/704 |
| 8,068,103 | B2* | 11/2011 | Zimmer | ................ G06F 3/0481 715/764 |
| 9,965,139 | B2* | 5/2018 | Nychis | ........................ G06F 8/38 |
| 2017/0052824 | A1* | 2/2017 | Sharma | .................... G06N 9/453 |

* cited by examiner

*Primary Examiner* — Timothy A Mudrick
(74) *Attorney, Agent, or Firm* — Law Office of Andrei D Popovici, PC

(57) ABSTRACT

A software robot is configured to automatically identify a target element (e.g., a button, a form field, etc.) within a user interface (UI) according to a set of attributes of the target element specified in the source-code of the respective UI. The robot's code specification includes a multiplicity flag which, when set, causes the robot to search for the target element within multiple instances of a UI object matching a subset of the set attributes (for instance, within all windows having a specific name, within all browser tabs, etc.)

20 Claims, 10 Drawing Sheets

ENHANCED TARGET SELECTION FOR ROBOTIC PROCESS AUTOMATION

CROSS-REFERENCE TO RELATED APPLICATIONS

This application is a continuation of U.S. patent application Ser. No. 17/816,415, filed on Jul. 31, 2022, entitled "Enhanced Target Selection for Robotic Process Automation," which is scheduled to issue as U.S. Pat. No. 11,635,977 on Apr. 25, 2023, which in turn is a continuation of U.S. patent application Ser. No. 16/730,247, filed Dec. 30, 2019, issued as U.S. Pat. No. 11,403,118 on Aug. 2, 2022, which are incorporated by reference herein.

BACKGROUND OF THE INVENTION

The invention relates to robotic process automation (RPA), and in particular to systems and methods for automatically identifying a user interface element targeted for an activity such as a mouse click or a text input.

RPA is an emerging field of information technology aimed at improving productivity by automating repetitive computing tasks, thus freeing human operators to perform more intellectually sophisticated and/or creative activities. Notable tasks targeted for automation include extracting structured data from documents, and interacting with user interfaces, for instance to fill in forms, among others.

A distinct prong of RPA development is directed at simplifying the programming and management of software robots, with the ultimate goal of extending the reach of RPA technology to users that lack advanced programming skills or training. One way of making RPA more accessible is the development of RPA-oriented integrated development environments (IDEs) which allow the programming of robots via graphical user interface (GUI) tools, instead of text-based coding.

However, automating the interaction with a user interface poses substantial technical challenges.

SUMMARY OF THE INVENTION

According to one aspect, a method comprises employing at least one hardware processor of a computer system, in response to receiving an RPA script indicating a target element of a target UI, to automatically identify a runtime instance of the target element within a runtime UI exposed by the computer system; and to automatically carry out an operation that reproduces a result of an interaction of a human operator with the runtime instance of the target element, the operation determined according to the RPA script. The RPA script specifies the target element as being a descendant of a selected node of a UI tree representation of the target UI. Automatically identifying the runtime instance of the target element comprises determining according to the RPA script whether a multiplicity flag is set in response, if the multiplicity flag is set, searching for the runtime instance of the target element within descendants of multiple instances of the selected node found within the runtime UI, and if the multiplicity flag is not set, searching for the runtime instance of the target element within descendants of a single instance of the selected node found within the runtime UI.

According to another aspect, a computer system comprises at least one hardware processor configured, in response to receiving an RPA script indicating a target element of a target UI, to automatically identify a runtime instance of the target element within a runtime UI exposed by the computer system; and to automatically carry out an operation that reproduces a result of an interaction of a human operator with the runtime instance of the target element, the operation determined according to the RPA script. The RPA script specifies the target element as being a descendant of a selected node of a UI tree representation of the target UI. Automatically identifying the runtime instance of the target element comprises determining according to the RPA script whether a multiplicity flag is set in response, if the multiplicity flag is set, searching for the runtime instance of the target element within descendants of multiple instances of the selected node found within the runtime UI, and if the multiplicity flag is not set, searching for the runtime instance of the target element within descendants of a single instance of the selected node found within the runtime UI.

According to another aspect, a non-transitory computer-readable medium stores instructions which, when executed by at least one hardware processor of a computer system, cause the computer system, in response to receiving an RPA script indicating a target element of a target UI, to automatically identify a runtime instance of the target element within a runtime UI exposed by the computer system; and to automatically carry out an operation that reproduces a result of an interaction of a human operator with the runtime instance of the target element, the operation determined according to the RPA script. The RPA script specifies the target element as being a descendant of a selected node of a UI tree representation of the target UI. Automatically identifying the runtime instance of the target element comprises determining according to the RPA script whether a multiplicity flag is set; in response, if the multiplicity flag is set, searching for the runtime instance of the target element within descendants of multiple instances of the selected node found within the runtime UI, and if the multiplicity flag is not set, searching for the runtime instance of the target element within descendants of a single instance of the selected node found within the runtime UI.

According to another aspect, a computer system comprises at least one hardware processor configured to expose a robot design interface to a user, the robot design interface configured to receive a user input indicating a target element of a target user interface (UI) and to expose a control enabling the user to set a multiplicity flag associated with the target element. The at least one hardware processor is further configured to output an RPA script comprising a specification of an RPA robot configured to carry out an operation that reproduces a result of an interaction of a human operator with a runtime instance of the target element, the RPA script including the multiplicity flag. Executing the RPA script on an RPA client computer causes the RPA client computer to causes the RPA client to determine according to the RPA script whether the multiplicity flag is set; in response, if the multiplicity flag is set, search for the runtime instance of the target element within descendants of multiple instances of the selected node found within the runtime UI, and if the multiplicity flag is not set, search for the runtime instance of the target element within descendants of a single instance of the selected node found within the runtime UI.

BRIEF DESCRIPTION OF DRAWINGS

The foregoing aspects and advantages of the present invention will become better understood upon reading the following detailed description and upon reference to the drawings where.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is used herein to denote any organized, searchable collection of data. Computer-readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
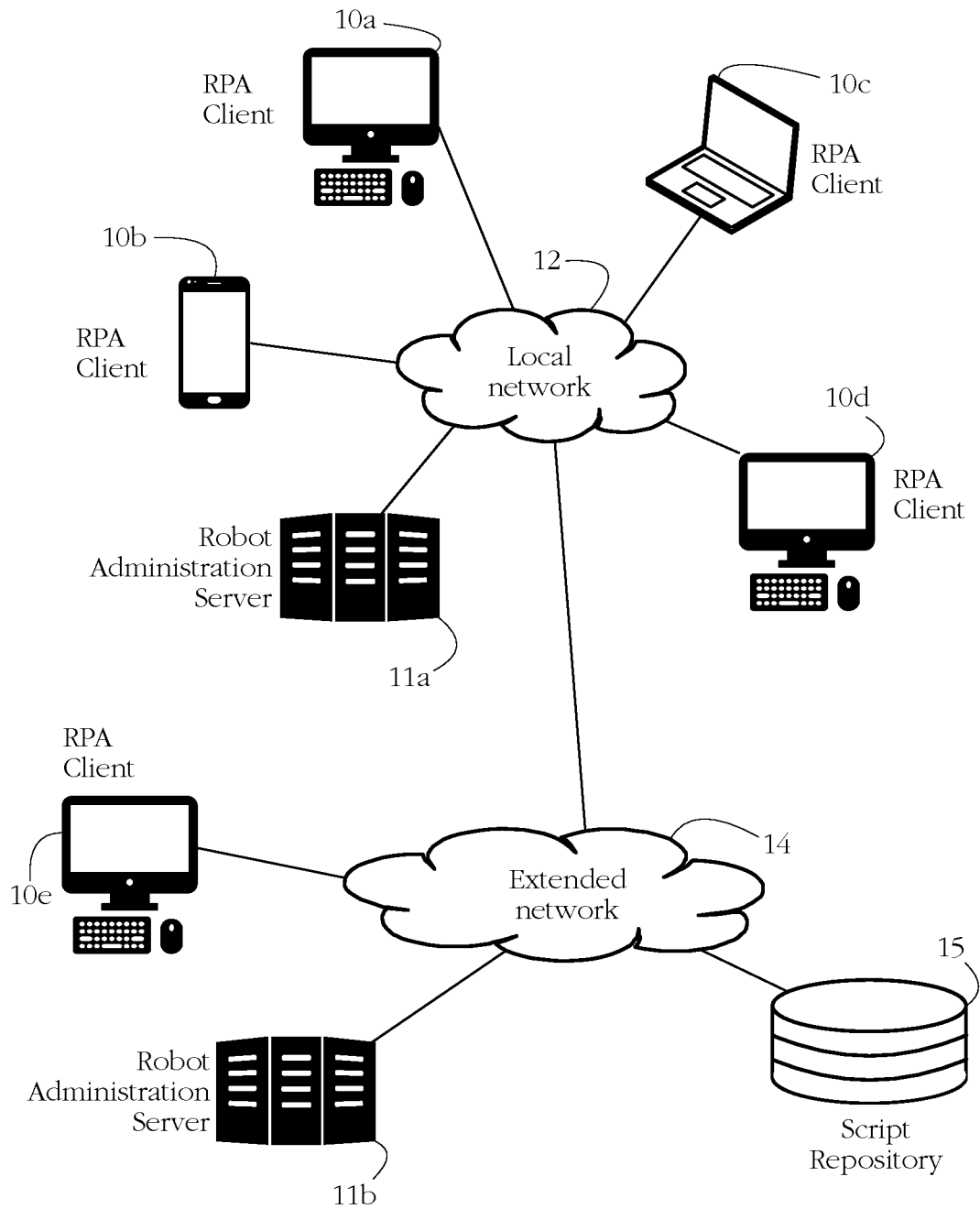
FIG. 1 shows an exemplary robotic process automation (RPA) system according to some embodiments of the present invention.

FIG. 1 shows an exemplary robotic process automation system according to some embodiments of the present invention. Each of a plurality of RPA clients 10a-e represents a computing device having at least a hardware processor, a memory unit and a network adapter enabling the respective RPA client to connect to a computer network and/or to other computing devices. Exemplary RPA clients 10a-e include personal computers, laptop and tablet computers, and mobile telecommunication devices (e.g., smartphones), among others. In an exemplary use case scenario, RPA clients 10a-d represent desktop computers belonging to an accounting or a human resources department of a company. The illustrated RPA clients 10a-d are interconnected by a local communication network 12, which may comprise a local area network (LAN). Clients 10a-d may further access an extended network 14 which may comprise a wide-area network (WAN) and/or the Internet. In the exemplary configuration of FIG. 1, RPA client 10e is connected directly to extended network 14. Such a client may represent a mobile computer, such as a laptop, tablet computer, or mobile telephone that connects to network 14 at various access points.

In a typical RPA scenario, a user such as an employee of a company uses a computer application (e.g., word processor, spreadsheet editor, browser, email application) to perform a repetitive task, for instance to issue invoices to various clients. To actually carry out the respective task, the employee performs a sequence of operations/actions, which is herein deemed a computer-implemented process. Exemplary operations forming a part of an invoice-issuing process may include opening a Microsoft Excel® spreadsheet, looking up company details of a client, copying the respective details into an invoice template, filling out template fields indicating the purchased items, switching over to an email application, composing an email message to the respective client, attaching the newly created invoice to the respective email message, and clicking a 'Send' button. RPA software executing on the employee's computer may automate the respective computer-implemented process by mimicking the set of operations performed by the respective human operator in the course of carrying out the respective task. Exemplary processes typically targeted for such automation include processing of payments, invoicing, communicating with clients (e.g., distribution of newsletters and/or product offerings), internal communication (e.g., memos, scheduling of meetings and/or tasks), payroll processing, etc.

Mimicking a human operation/action is herein understood to encompass reproducing the sequence of computing events that occur when a human operator performs the respective operation/action on the computer, as well as reproducing a result to of the human operator's performing the respective operation on the computer. For instance, mimicking an action of clicking a button of a graphical user interface may comprise having the operating system move the mouse pointer to the respective button and generating a mouse click event, or may alternatively comprise toggling the respective GUI button itself to a clicked state, without moving the mouse pointer.

Figure 2:
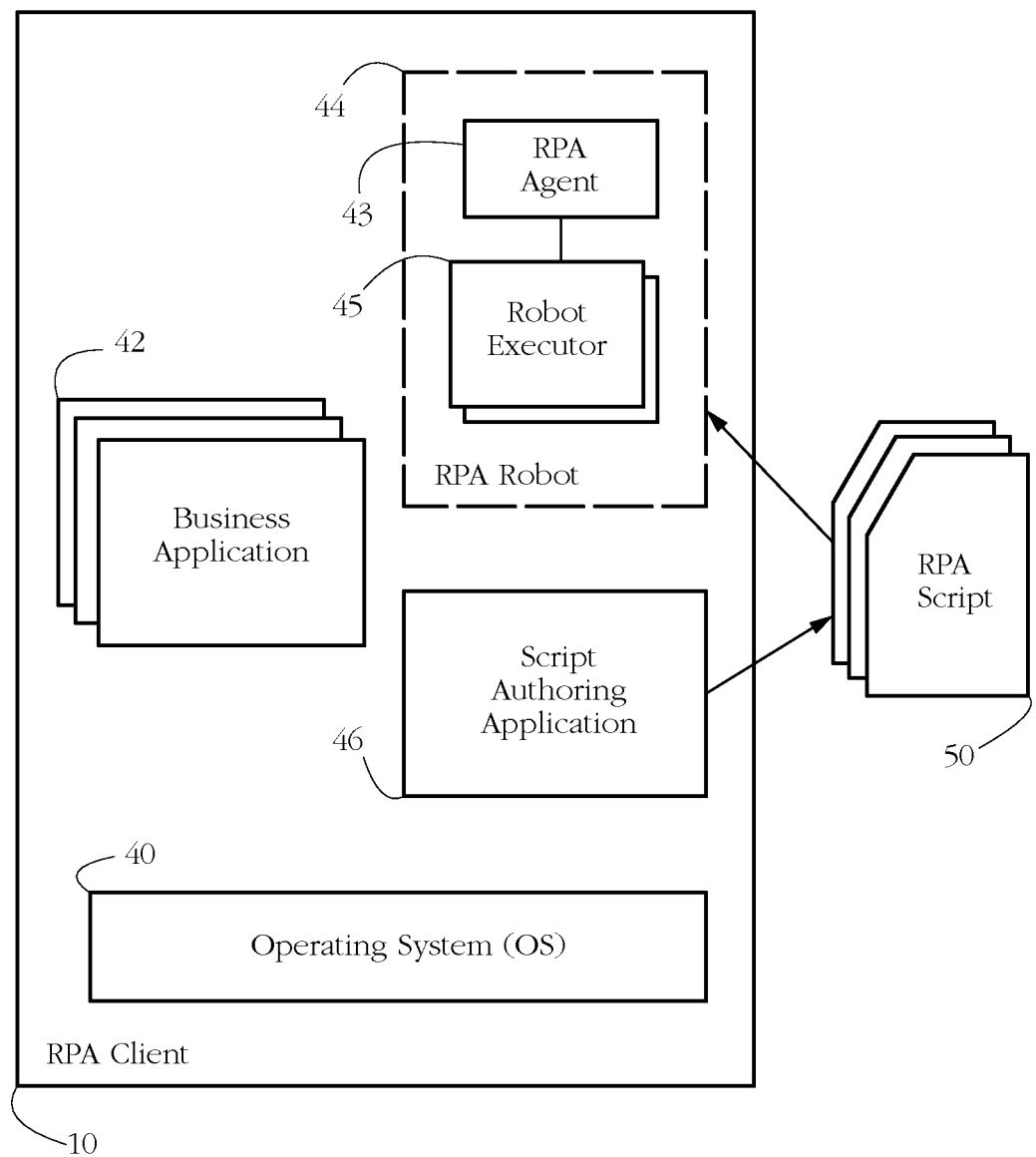
FIG. 2 shows exemplary software executing on an RPA client according to some embodiments of the present invention.

FIG. 2 shows exemplary software executing on an RPA client 10 according to some embodiments of the present invention. RPA client 10 may represent any of RPA clients 10*a-e* in FIG. 1. RPA client 10 executes an operating system (OS) 40, and a set of computer applications 42. OS 40 may comprise any widely available operating system such as Microsoft Windows®, MacOS®, Linux®, iOS®, or Android®, among others, comprising a software layer that interfaces between applications 42 and the hardware of RPA client 10. Applications 42 generically represent any computer program used by a human operator of RPA client 10 to carry out a task. Exemplary applications 42 include, among others, a word processor, a spreadsheet application, a graphics application, a browser, a social media application, and an electronic communication application. At least one application 42 is configured to expose a user interface (UI) that is targeted for automation as detailed below.

In some embodiments, RPA client 10 further executes an RPA robot 44 which comprises a set of interconnected computer programs that collectively implement an automation of a computer-implemented process. An exemplary RPA robot is constructed using a Windows Workflow Foundation Application Programming Interface from Microsoft®, Inc. In some embodiments, RPA robot 44 executes within a separate, dedicated virtual machine instantiated on RPA client 10.

Components of RPA robot 44 include an RPA agent 43 and a set of robot executors 45. Robot executors 45 are configured to receive an RPA script 50 indicating a sequence of operations (also known in the art as activities) that mimic the actions of a human operator carrying out a computer-implemented process, and to actually execute the respective sequence of operations on the respective client machine. RPA scripts 50 are typically process-specific, i.e., each distinct process is described by a distinct set of RPA scripts. An RPA script 50 may be formulated according to any computer-implemented data specification known in the art. In a preferred embodiment, RPA script 50 is encoded in a version of an extensible markup language (XML), but script 50 may also be formulated in a programming language such as C#, Visual Basic, Java, etc. Alternatively, RPA script 50 may be specified in an RPA-specific version of bytecode, or even as a sequence of instructions formulated in a natural language such as English, Spanish, Japanese, etc. In some embodiments, script 50 is pre-compiled into a set of native processor instructions (e.g., machine code).

In some embodiments, robot executor 45 comprises an interpreter (e.g., a just-in-time interpreter or compiler) configured to translate RPA script 50 into a runtime package comprising processor instructions for carrying out the operations described in the respective script. Executing script 50 may thus comprise executor 45 translating RPA script 50 and instructing a processor of RPA client 10 to load the resulting runtime package into memory and to launch the runtime package into execution.

In some embodiments, RPA agent 43 manages the operation of robot executors 45. For instance, RPA agent 43 may select tasks/scripts for execution by robot executor(s) 45 according to an input from a human operator and/or according to a schedule. Agent 43 may further configure various operational parameters of executor(s) 45. When robot 44 includes multiple executors 45, agent 43 may coordinate their activities and/or inter-process communication. RPA agent 43 may further manage communication between RPA robot 44 and other components of the RPA system illustrated in FIG. 1. Such components may execute on other RPA clients and/or a set of robot administration servers 11*a-b*. In one such example, servers 11*a-b* may operate a robot orchestrator service coordinating RPA activities across multiple client machines and enabling complex scheduling and/or license management. Servers 11*a-b* may further receive data from individual RPA robots indicating various intermediate values and/or results of executing RPA scripts. Such data may be used to generate activity reports, to enforce licensing agreements, and/or to mitigate malfunctions.

In some embodiments, RPA client 10 further executes a script authoring application 46 configured to enable a human operator of RPA client 10 to create RPA script 50 and thus effectively design a robot to perform a set of activities. Authoring application 46 may function like an integrated development environment (IDE), comprising a code editor and/or a user interface enabling the operator to interact with a set of tools for modeling a computer-implemented process. An exemplary authoring application may allow a user to select an application 42 and to indicate a desired manner of interacting with the respective application, e.g., to indicate a sequence of operations to be performed by robot 44. Exemplary operations include, for instance, opening a specific Excel® spreadsheet, reading data from a specific row/column of a data table, processing the respective data in a specific manner, clicking on a specific button, composing and sending an email message, navigating to a specific unified record location (URL), etc. In some embodiments, authoring application 46 outputs RPA scripts 50 in a format readable by RPA robot 44 (e.g., XML). RPA scripts 50 may be stored in a script repository 15 communicatively coupled to and accessible to RPA clients 10*a-e* via network 12 and/or 14 (see FIG. 1). In a preferred embodiment, script repository 15 is directly linked to robot administration server(s) 11*a-b*. Script repository 15 may be organized as a database, e.g., any structured data collection allowing a selective retrieval of scripts 50 according to a set of criteria.

A skilled artisan will appreciate that not all components illustrated in FIG. 2 need to execute on the same physical processor or machine. In typical RPA configurations, script development/robot design is carried out on one machine (commonly known in the art as the 'design side'). The resulting RPA script 50 is then distributed to multiple other users and machines for execution (usually known as 'runtime side' or simply 'runtime').

Figure 3:
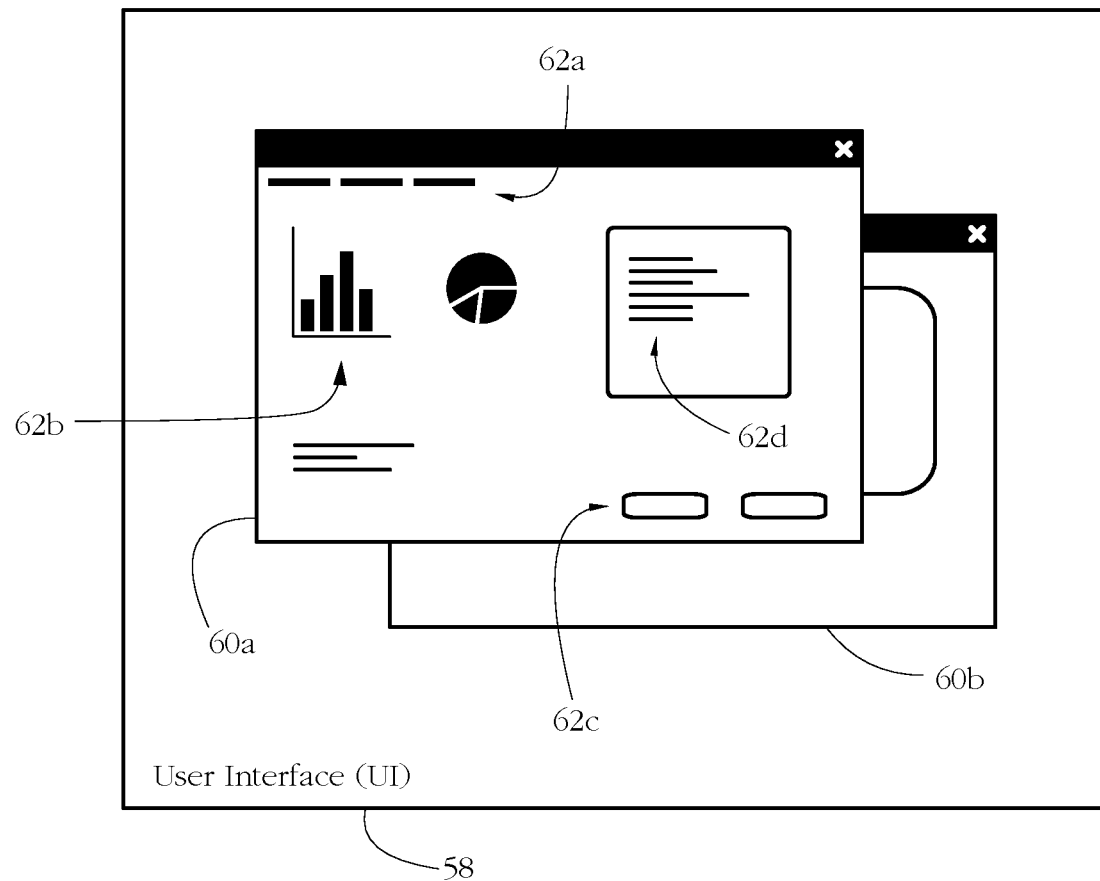
FIG. 3 shows an exemplary user interface (UI) comprising a plurality of UI elements according to some embodiments of the present invention.

FIG. 3 shows an exemplary user interface (UI) 58 according to some embodiments of the present invention. UI 58 may be exposed by any of the applications 42. A user interface is a computer interface that enables human-machine interaction, e.g., an interface configured to receive user input and to respond to the respective input. A common example of user interface is known as a graphical user interface (GUI), which enables human-machine interaction via a set of visual elements displayed to the user. GUIs typically organize the display content in windows. Without loss of generality, a window is herein defined as a (typically rectangular) region of a screen, the contents of which may be manipulated (e.g., shown, hidden, moved, etc.) as a whole. A window may or may not have a visible frame delimiting the content of the respective window from the rest of the visual display.

Illustrative UI 58 has a set of exemplary windows 60*a-b* and a set of exemplary UI elements including a menu indicator 62*a*, an icon 62*b*, a button 62*c*, and a text box 62*d*. Other exemplary UI elements comprise, among others, a window, a label, a form, an individual form field, a toggle, a link (e.g., a hyperlink, hypertext, or a uniform resource identifier). UI elements may display information, receive input (text, mouse events), and/or control a functionality of software and/or the respective computer system.

Some UI elements are interactive in the sense that acting on them (e.g., clicking button 62c) triggers a behavior/reaction. Such behaviors/reactions are typically specific to the respective element or to a group of elements. For instance, clicking a save button produces a different effect than clicking a print button. The same keyboard shortcut (e.g., Ctrl-G) may have one effect when executed in one window/application, and a completely different effect when executed in another window/application. So, although the operation/action/activity is the same (executing a click, pressing a combination of keyboard keys, writing a sequence of characters, etc.), the result of the respective operation may depend substantially on the operand of the respective operation. An operand is herein defined as the UI element that is acted upon by a current operation such as a click or a keyboard event, or stated otherwise, the UI element selected to receive the respective user input. The terms 'target' and 'operand' are herein used interchangeably. Since UI element behaviors are element-specific, successful RPA may require unambiguously and correctly identifying operands for each scripted RPA activity.

Figure 4:
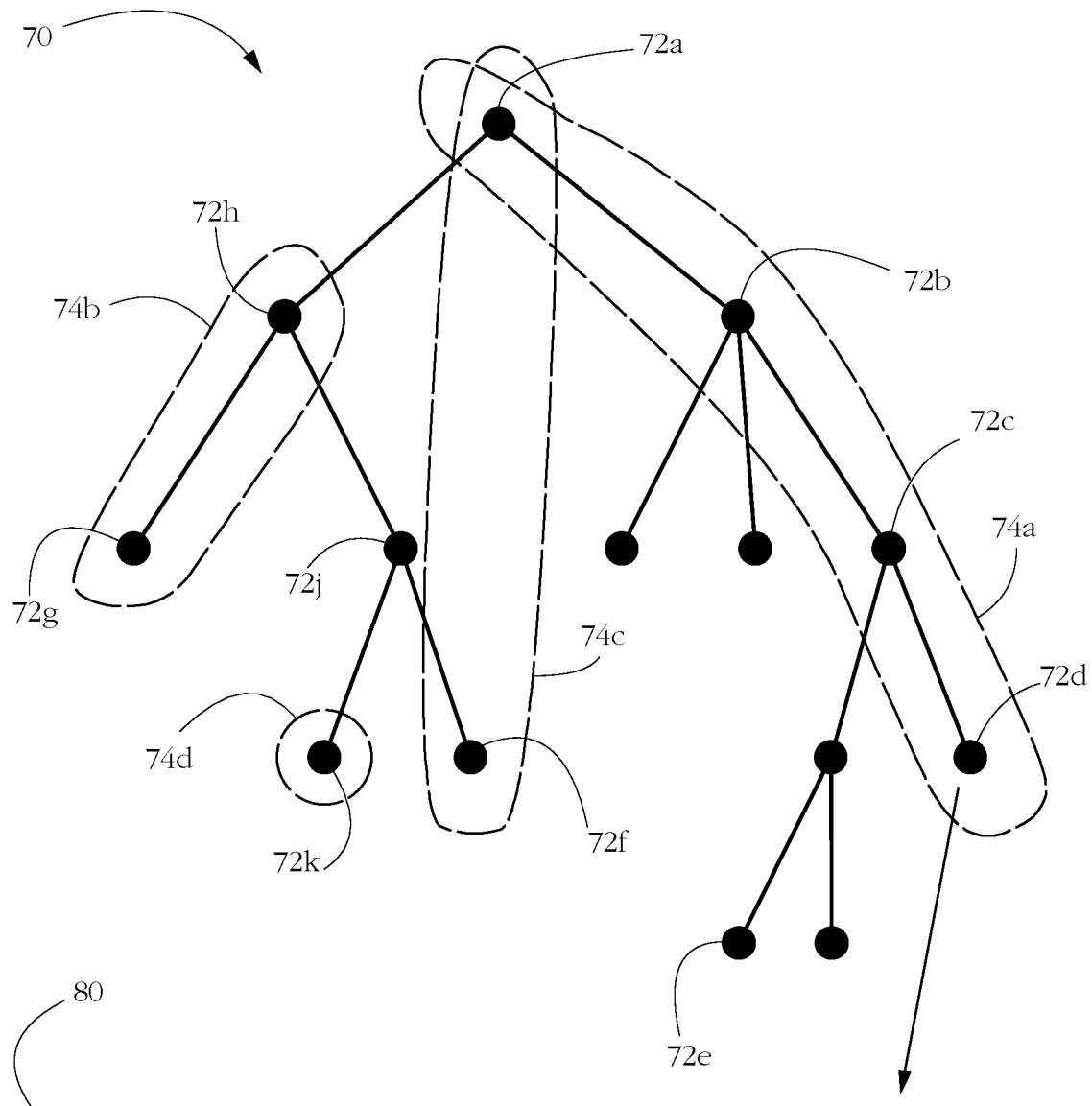
FIG. 4 shows an exemplary UI tree and an exemplary element ID characterizing a node of the UI tree according to some embodiments of the present invention.

In modern computing platforms, the operating system typically represents each user interface as a hierarchical data structure commonly known as a UI tree. An exemplary UI tree comprises a document object model (DOM) underlying a webpage rendered by a browser application. FIG. 4 shows an exemplary UI tree 70 having a plurality of nodes 72a-k. In some embodiments, each node 72a-k comprises an object representing a part of UI 58. In an exemplary GUI, a root node 72a may represent an entire GUI window. Its children nodes 72b and 72h may represent individual UI elements (e.g., text boxes, labels, form fields, buttons, etc.), groups of elements, distinct regions or blocks of the respective UI, etc. An intermediate node such as node 72b in FIG. 4 may represent a whole form, including all its input fields, labels and buttons. For instance, node 72b may represent the contents of a <form> or <fieldset> container of an HTML document. Another example of an intermediate node may represent a content of a <div> or <span> HTML container. Yet another example of intermediate node comprises contents of a header or footer of a document. End nodes such as 72d, 72e, 72f, 72g, and 72k (also known in the art as leaf nodes) are nodes that have no further children nodes, and may represent individual UI elements (e.g., a button, an individual label, an individual input field). In an example of a web browser UI, end nodes may represent individual images, hyperlinks, text paragraphs, etc.

In the following description, a set of nodes consisting exclusively of a selected node of the UI tree and of its descendants is herein deemed a subtree of the UI tree. The respective subtree is further deemed a subtree of an ancestor of the root node of the respective subtree. In the illustrative UI tree depicted in FIG. 4, nodes 72f-g-h-j-k form an exemplary subtree of node 72a, since node 72h is a descendant (child) of node 72a.

To enable a successful and ideally unambiguous identification by robot 44, some embodiments of the present invention represent each UI element by way of an element ID characterizing the respective UI element. An exemplary element ID indicates a location of a target node within UI tree 70, wherein the target node represents the respective UI element. For instance, the element ID may identify a target node/UI element as a member of a selected subset of nodes. The selected subset of nodes may form a genealogy, i.e., a line of descent through the UI tree wherein each node is either an ancestor or a descendant of another node. Exemplary genealogies 74a-d are illustrated in FIG. 4.

In some embodiments, the element ID comprises an ordered sequence of node indicators, the sequence tracing a genealogical path through the UI tree, the path ending in the respective target node/UI element. Each node indicator may represent a member of an object hierarchy of the respective UI, its position within the sequence consistent with the respective hierarchy. For instance, each member of the sequence may represent a descendant (e.g., child node) of the previous member, and may have the following member as a descendant (e.g., child node.) In a HTML example, an element ID representing an individual form field may indicate that the respective form field is a child of an HTML form, which in turn is a child of a specific section of a webpage, etc. The genealogy does not need to be complete—exemplary genealogy 74c comprises just the leaf and root node, but still identifies node 72f as a UI element displayed within the GUI window represented by root node 72a.

In one such example illustrated in FIG. 4, wherein an element ID 80 is expressed in a version of XML, each individual node indicator comprises an XML tag. Element ID 80 characterizing node 72d therefore may comprise a sequence of tags, the first tag representing a GUI window (node 72a), while the last tag represents the target node 72d itself (in this example, a button.) Intermediate tags of element ID 80 may represent nodes such as 72b and 72c, among others. Each tag may consist of a sequence of characters, the sequence book-ended by implementation-specific delimiters (in the current example, each tag begins with <and ends with />.) In FIG. 4, each tag is specified via a set of attribute-value pairs, which may indicate, for instance, a name and a type of UI element represented by the respective node, among others. The illustrated format of element ID 80 is provided only as an example; a skilled artisan will appreciate that there may be multiple other ways of representing a location of a specific node within a UI tree, beside a list of attribute-value pairs.

At runtime, software robot 44 may attempt to identify an operand/target of an action within a runtime instance of the target UI (i.e., within an instance of a user application executing on the runtime machine.) In practice, identifying the operand comprises attempting to identify a runtime instance of a target UI element, herein deemed runtime target. Some embodiments attempt such identification according to the respective element's ID and/or according to other information such as an image of the respective UI element, a label displayed next to or on top of the respective UI element, a relative position of the UI element with respect to other elements, etc. Matching element IDs may fail in various situations, for instance, when some characteristic features of the respective UI element have changed between design and runtime. In another example, finding the runtime target may fail when the runtime UI has multiple windows with the same characteristic features (e.g., multiple windows having the same name or title). Robot 44 may search for the runtime target within one such window, and when the search fails, conclude that the runtime target cannot be found. However, the runtime target may be displayed within another window with the same name/title. To overcome such situations, some embodiments use a multiplicity flag to instruct robot 44 to search within multiple windows with the same characteristic features, as shown in detail below.

Figure 5:
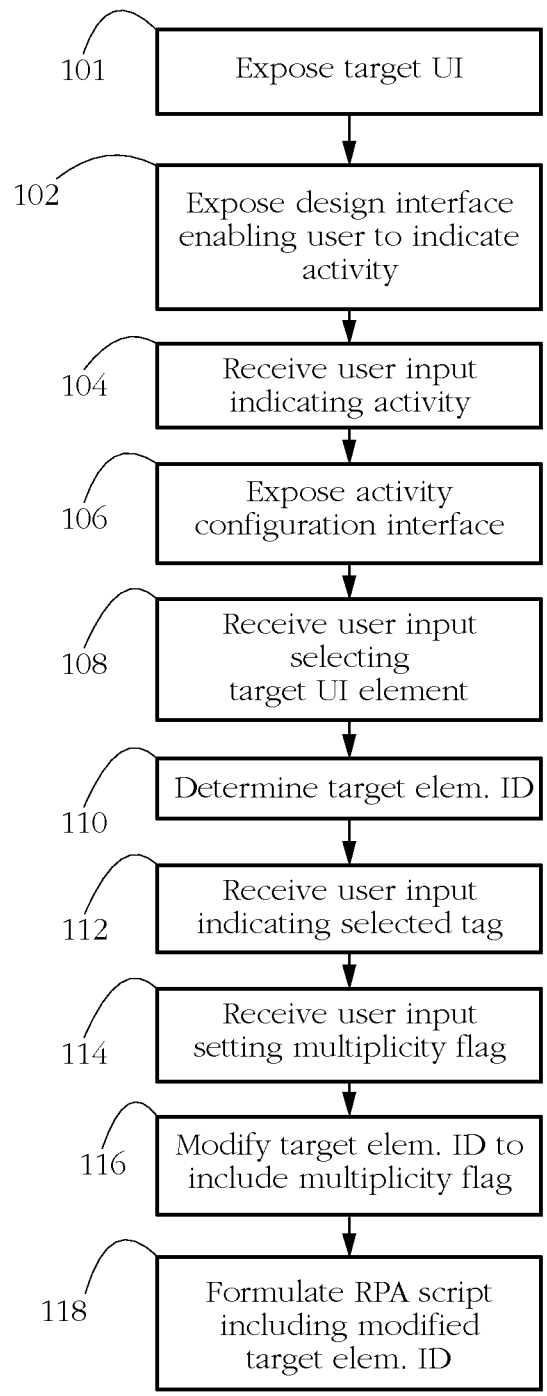
FIG. 5 shows an exemplary sequence of steps performed by a script authoring application according to some embodiments of the present invention.

FIG. 5 shows an exemplary sequence of steps performed by script authoring application 46 to enable target identification by matching element IDs using multiplicity flags according to some embodiments of the present invention. A step 101 exposes a target UI, i.e., a design-side instance of a user interface of an application 42, which is the target of the current automation. Step 101 may comprise, for instance, invoking an instance of application 42. In a step 102, application 46 may expose a robot design interface (e.g., a GUI) enabling a user to indicate a desired activity to be performed by robot 44 on the exposed target UI. In some embodiments, the activities may be reached via a hierarchy of activity menus. Activities may be grouped according to various criteria, for instance, according to a type of computer application (e.g., MS Excel® activities, web activities, email activities), and/or according to a type of interaction (e.g., mouse activities, hotkey activities, data grabbing activities, form filling activities, etc.). A step 104 receives user input indicating the respective activity. For instance, step 104 may comprise intercepting a mouse click event and determining a menu item that the user has clicked on to select an activity. In a further step 106, application 46 may expose an activity configuration interface enabling the user to configure various options and/or parameters of the respective activity. One exemplary activity parameter is the operand/target UI element of the respective activity. In one example wherein the activity comprises a mouse click, the target UI element may be a button, a menu item, a hyperlink, etc. In another example wherein the activity comprises filling out a form, the target UI element may be the specific form field that should receive the respective text input. Application 46 may enable the user to indicate the target UI element in various ways. For instance, it may invite the user to select the target element from a menu/list of candidate UI elements. In a preferred embodiment, application 46 may expose an instance of the target UI (i.e., the UI of the computer application that robot 44 is supposed to interact with, for instance MS Excel®, a browser, an email program, etc.), and highlight a subset of UI elements within the respective UI, inviting the user to click on one to indicate a selection. In a step 108, application 46 may receive and process the user input indicating the selected target element, for instance by calling certain OS functions to detect the mouse click and identifying the clicked UI element.

Next, a step 110 may determine the element ID of the selected UI element. Step 110 may comprise parsing a source code (e.g., HTML) of the target UI, extracting and/or formulating a set of tags including attribute-value pairs.

Figure 6:
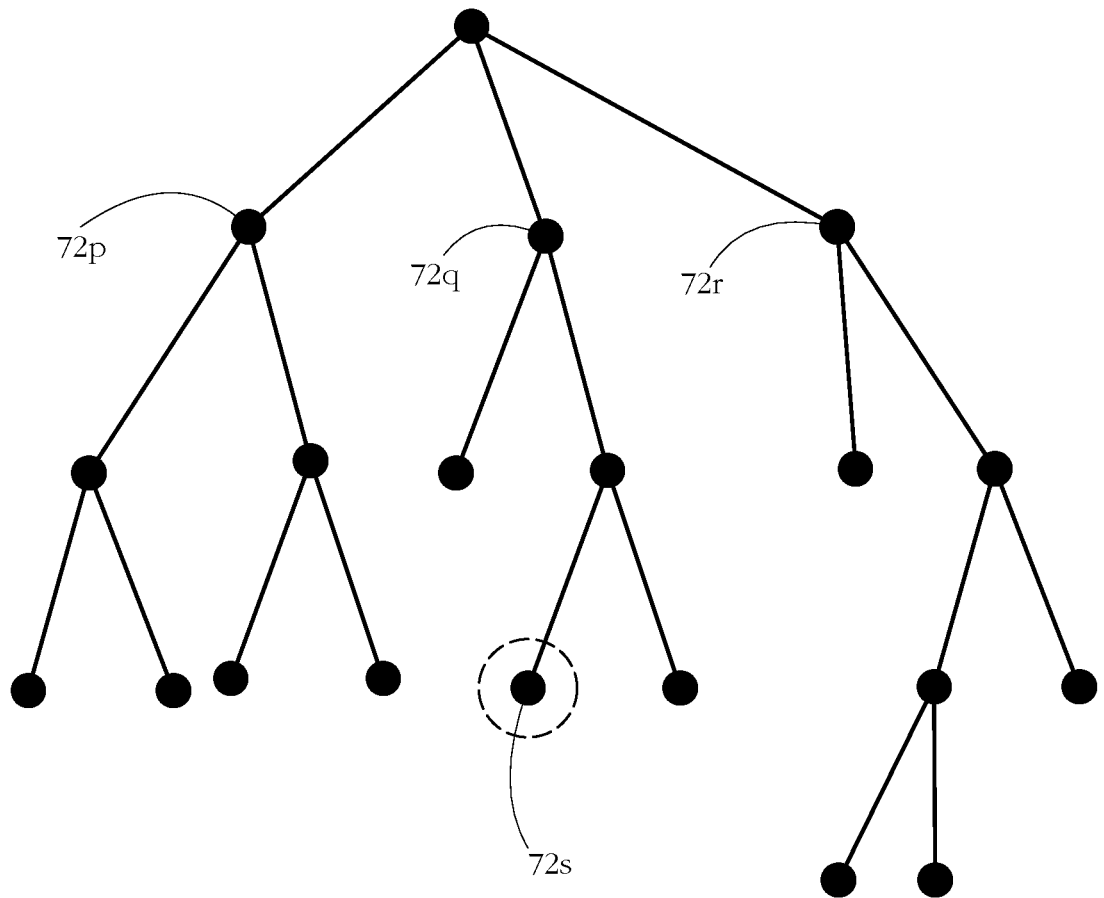
FIG. 6 shows an exemplary tree representation of a runtime UI according to some embodiments of the present invention.

A further sequence of steps 112-114 enables the designer to instruct software robot 44 to use multiplicity flags when attempting to identify the runtime target. Some embodiments rely on the observation that in certain instances of robotic process automation, the runtime UI may have multiple objects having the same properties, which may confuse the robot and/or prevent a successful identification of the runtime target. One such example directed at automating the interaction with a webpage is illustrated in FIG. 6. The illustrated UI tree may represent for instance a runtime instance of a browser GUI. The respective browser may have multiple browser tabs opened simultaneously, which is often the case with modern Internet browsing. In the example of FIG. 6, nodes 72p-q-r represent three distinct browser tabs, each displaying a different content. However, nodes 72p and 72q have the same tag attributes, for instance the same window name/title, the same class assignment, etc. Such situations may frequently occur in practice, for instance when tabs 72p-q show different pages of the same website (e.g., different product pages of the same webshop, different posts of the same blog, etc.) Furthermore, the runtime target (say, a form field represented by node 72s) only appears in one of the browser tabs. A conventional RPA robot may search for a window/tab with the respective name, find tab 72p and continue searching within it for an instance of the target UI element. However, when the robot does not find any node with the attributes of node 72s within the respective tab, it may wrongly conclude that the runtime target cannot be found. The problem may be further aggravated by search optimization strategies wherein the robot only searches for the runtime target within the window currently having the focus. When the respective window unexpectedly loses the focus, for instance following an event that generates an emergency popup window, such a conventional search may fail.

Some embodiments of the present invention address such runtime RPA problems by instructing the robot that the runtime UI may have multiple instances of a particular UI object (e.g., window, form, menu, page section, etc.) Such instructions may be given via a multiplicity flag attached to the node representing that particular UI element/object within the design-time UI tree. In some embodiments, when the multiplicity flag is set for a selected node at design-time, it instructs the robot to search for the runtime target within subtrees of all runtime instances of the selected node. In the above example illustrated in FIG. 6, setting the multiplicity flag for a design-time node representing the browser tab characterized by features matching both runtime tabs 72p and 72q instructs the robot to search for the form field represented by node 72s within both respective browser tabs. A search algorithm which uses multiplicity flags is described in detail below in relation to FIG. 8.

A skilled artisan will appreciate that there may be many ways of attaching a multiplicity flag to a UI object, for instance by adding a new Boolean data type to an existing data structure representing the UI object, adding a new attribute to a set of attribute-value pairs describing the UI object, etc. Some embodiments of the present invention introduce the multiplicity flag as an additional attribute within a tag that represents the respective node in element ID 80. In one such example, in response to the user indicating a target UI element, application 46 may expose a configuration GUI enabling the user to configure various tags and/or attributes including a multiplicity flag.

Figure 7:
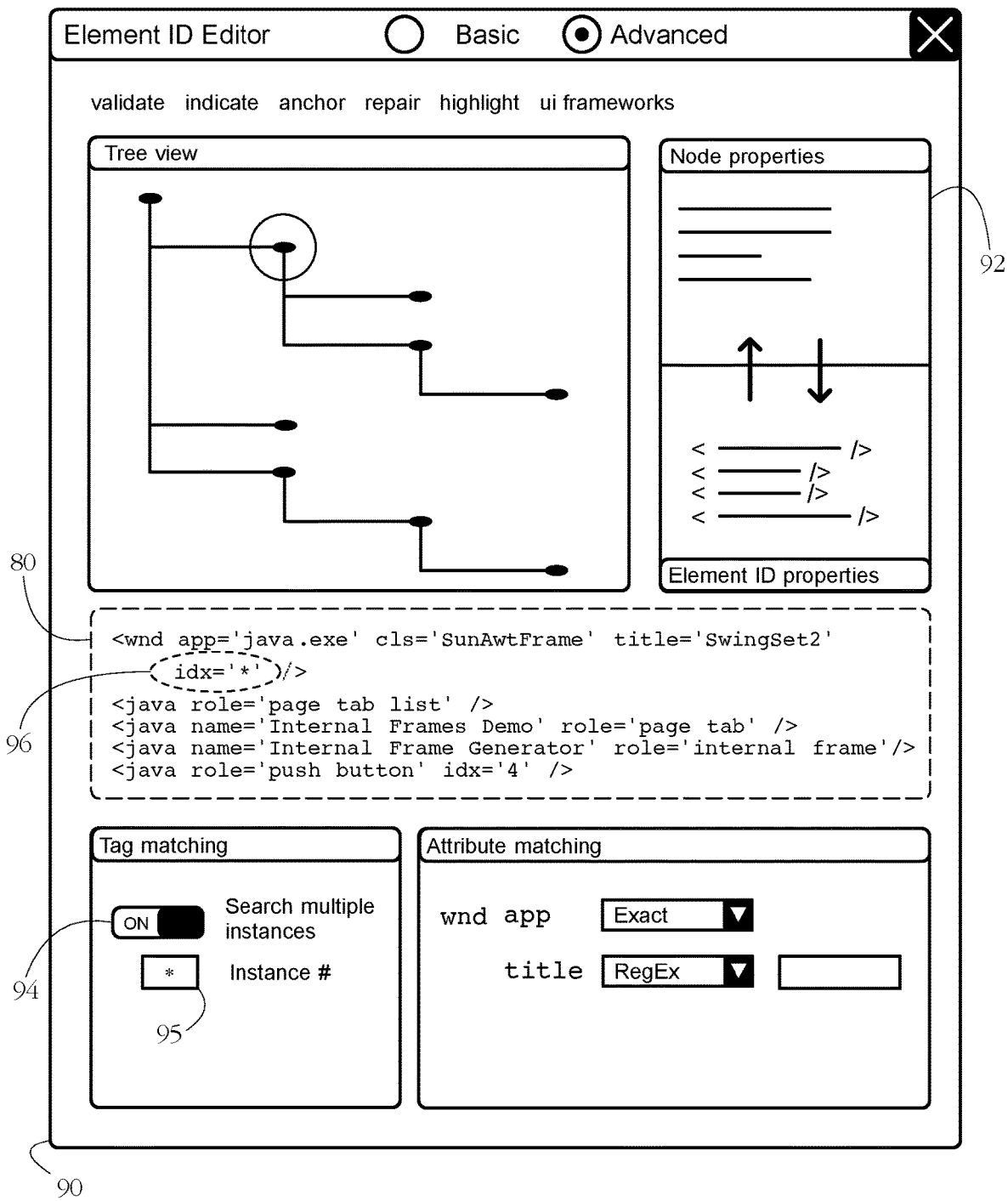
FIG. 7 illustrates an exemplary graphical user interface of a script authoring application according to some embodiments of the present invention.

FIG. 7 shows an example of such a configuration GUI according to some embodiments of the present invention. GUI 90 may comprise a window having various zones, for instance an area for displaying a tree view of the design-time target UI, which allows the user to easily visualize the selected target UI element as a node in a tree representation of the target UI. GUI 90 may further display element ID 80, allowing the user to visualize currently defined tags, attributes and/or values characterizing the respective target UI element. Some embodiments may further include a tag builder pane 92 enabling the user to select which nodes/tags and/or which attributes of each node to include in element ID 80.

Configuration GUI 90 may further include a tag matching pane enabling the setting of matching parameters for individual tags. In some embodiments, a user may select a tag for configuration, for instance by highlighting it within the displayed element ID 80 or by clicking on a node of the UI tree, the node represented by the respective tag. The user may then set configuration options which control a manner in which RPA robot 44 will search for and/or match the respective tag at runtime. In some embodiments, GUI 90 enables a user to set a multiplicity flag for the current tag, for instance using a toggle switch 94. Setting the flag (e.g., by switching to 'ON') may effectively instruct the robot to search for the runtime target within multiple instances of the node represented by the current tag in the runtime UI. Some embodiments further include an input field 95 wherein the user can specify a range of instances of the respective node to be searched at runtime. For instance, inputting 1-5 may cause the robot to search through the first 5 instances (e.g., first five browser tabs with the same title, etc.). In some embodiments, inputting a pre-determined character (e.g., '*') instructs the robot to search through all instances of objects that match the respective tag.

GUI 90 may further include an attribute matching pane enabling the user to set matching parameters for individual tag attributes. In one example, in response to the user selecting a node/tag, the attribute matching pane may display each attribute of the respective tag, and a set of inputs for configuring each attribute. In the example of FIG. 7, a dropdown menu enables the user to indicate a matching method the robot should use for the respective attribute. Exemplary methods include exact and approximate matching methods. Exact matching may require that the runtime value of the respective attribute exactly match the design-time value. Approximate matching may only require a partial match between the design-time and runtime values of the respective attribute. Exemplary flavors of approximate matching include fuzzy, regular expressions, and wildcard, among others. Approximate matching is typically applied to attributes of type text (i.e., character strings).

In response to receiving user input indicating setting the multiplicity flag for a selected tag (steps 112-114 in FIG. 5), in a step 116 script authoring application 46 may encode the respective information into RPA script 50. In a preferred embodiment, step 116 comprises modifying element ID 80 by adding a new attribute-value pair to the respective tag, the respective attribute-value pair indicating that the multiplicity flag is set for the respective tag. In one example comprising setting the multiplicity flag for a UI window, the modified tag reads:

<wnd app='java.exe' cls='SunAwtFrame' title='SwingSet2' idx='*' />, wherein the attribute "idx" was added to the original <wnd I> tag. The illustrated idx attribute has the value "*" to indicate that robot 44 should search for the runtime target in all runtime windows that match the respective tag's attributes. In the current example, RPA robot 44 will search within all UI windows titled "SwingSet2", belonging to application "java.exe" and having the class assignment "SunAwtFrame". The multiplicity flag is illustrated as item 96 in FIG. 7.

Steps 102-116 (FIG. 5) may be repeated for each activity required as part of the designed computer-implemented process. A further step 118 outputs the robot's code to be used at runtime, for instance to a script file. RPA script 50 may be formulated in any computer-readable encoding known in the art, for instance in a version of XML or even compiled into a sequence of native processor instructions (e.g., machine code). For each activity/automation step, authoring application 46 may output to RPA script 50 an indicator of the respective activity (e.g., click, type into, etc.) and an encoding of element ID 80 representing the respective target UI element. In some embodiments, application 46 may further output to RPA script 50 a set of parameter values for configuring each activity, for instance using a set of attribute-value pairs. One exemplary parameter is a timeout threshold indicating a maximum amount of time robot 44 may spend attempting to identify a runtime instance of a target UI element.

Figure 8:
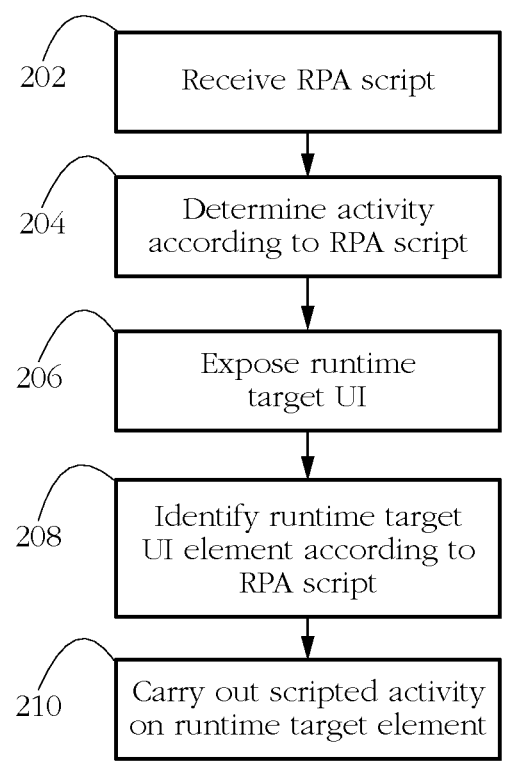
FIG. 8 shows an exemplary sequence of steps performed by an RPA robot according to some embodiments of the present invention.

Once the design phase of automation is complete, RPA script 50 may be transmitted to script repository 15 and/or distributed to other RPA clients for execution (see e.g., FIG. 1). FIG. 8 shows an exemplary sequence of steps carried out by RPA robot 44 at runtime. In response to receiving RPA script 50, a step 204 determines a type of activity to be performed according to a content of RPA script 50. Step 204 may further determine a target UI and/or a runtime application (e.g., MS Excel®, Google Chrome®, etc.) that the respective robot is configured to interact with according to RPA script 50. In a step 206, RPA robot 44 may expose the respective runtime UI, for instance by invoking an instance of the respective computer application on the local client machine. A further step 208 may automatically identify a runtime target, i.e., an operand for the respective activity according to information stored in RPA script 50. The operand comprises the element that robot 44 is configured to act upon (e.g. to click, to enter some text into, to grab the contents of, etc.) Stated otherwise, the operand is a runtime instance of a target UI element identified by the designer of robot 44; ideally, the runtime target is an exact copy of the design-time target, but differences may occur for various reasons. The execution of step 208 is described in detail below. In response to a successful identification of a runtime target UI element, a step 210 may automatically carry out the scripted activity, i.e., interact with the respective UI element as indicated in RPA script 50.

Figure 9:
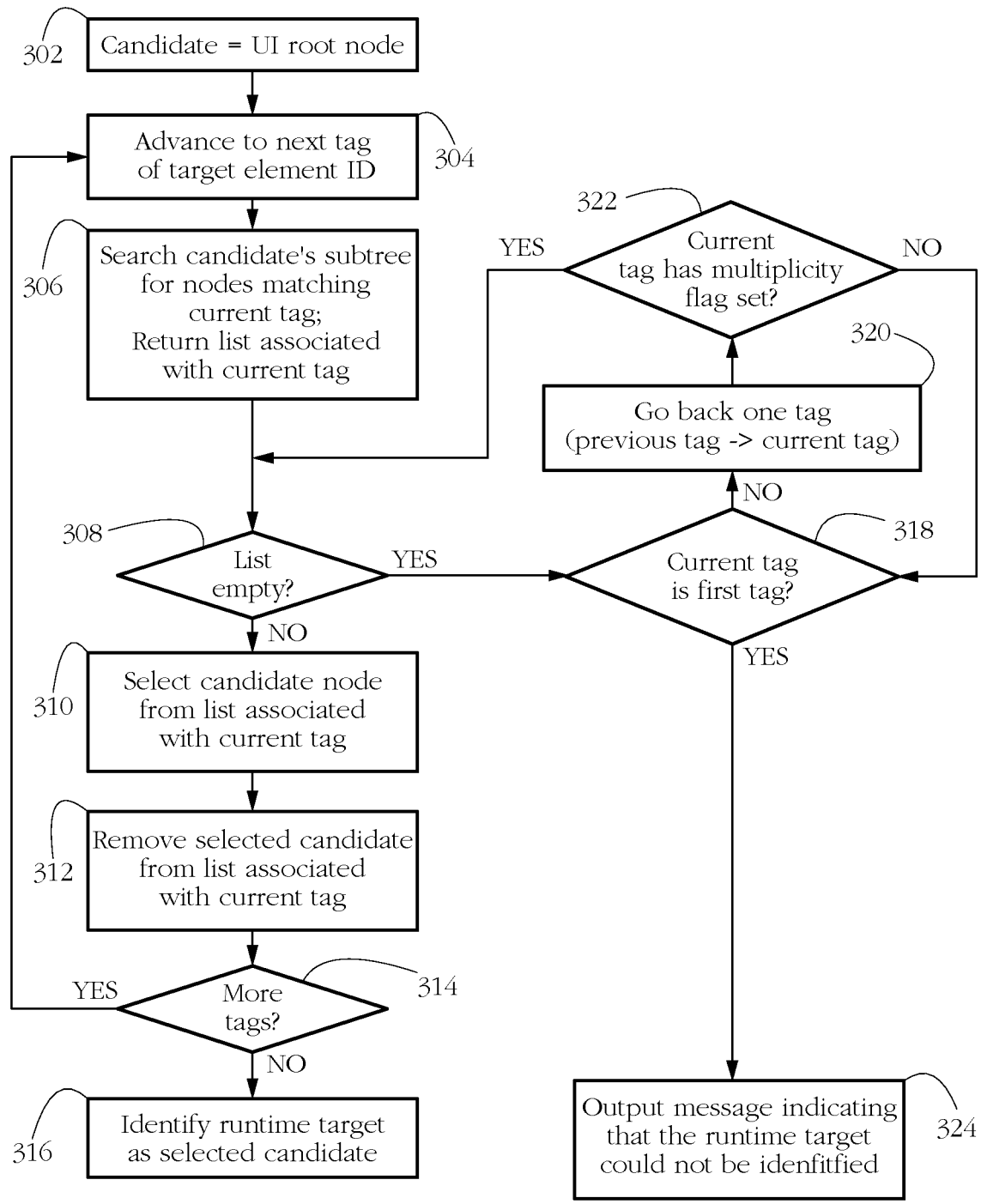
FIG. 9 shows an exemplary sequence of steps carried out by the RPA robot to identify a runtime target UI element according to some embodiments of the present invention.

FIG. 9 shows an exemplary sequence of steps performed by robot 44 to automatically identify the runtime target (step 208 in FIG. 8) according to some embodiments of the present invention. The illustrated method attempts to identify the runtime target only according to the element ID characterizing the respective target. Alternative methods may combine element ID matching with other types of information such as image and text data, but such methods are generally beyond the scope of the present disclosure.

In some embodiments, starting with the first (top) tag of element ID 80, robot 44 may search the runtime UI tree for a node matching the first tag. When a matching node is found, robot 44 may search subtrees of the matching node for another node matching the second tag of element ID 80. The search may thus progress recursively through the runtime UI tree, from the root node towards leaf nodes. The search may end either with a successful identification of the runtime target or in a failure to find a node matching all tags of element ID 80. Matching a tag is herein understood to mean matching all attribute-value pairs of the respective tag in the manner indicated by the respective tag (e.g., exact matching or approximate matching as indicated for each attribute). In the example illustrated in FIG. 7, matching the window tag:

<wnd app='java.exe' cls='SunAwtFrame' title='SwingSet2'/> may comprise searching the runtime UI tree for a node having the attribute-value pairs app='java.exe', cls='SunAwtFrame' and title='Swing Set2'.

In a step 302, robot 44 may start the search by designating the root node of the runtime UI tree as a candidate runtime target. A step 304 may then advance to the next tag of element ID 80. A step 306 may search subtrees of the current candidate node for nodes matching the current tag. Some embodiments identify all matching nodes and place them on a new list of candidates. The illustrated algorithm associates a distinct list of candidate nodes with each distinct tag of element ID 80. When the list of candidates associated with the current tag is non-empty, i.e., there are nodes matching the current tag, a sequence of steps 310-312 selects a node from the list as the new current candidate node and removes it from the list. A step 314 checks whether there are still tags of element ID 80 to be matched. When no, indicating that the search is complete, a step 316 reports a successful identification of the runtime target in the current candidate node.

When there are further tags to match, robot 44 returns to step 304 to continue the search with the next tag of element ID 80, with the observation that now the robot may search for matching nodes only within subtrees of the currently selected candidate node (i.e., recursive search).

In some embodiments of the present invention, when step 306 cannot find any candidate nodes matching the current tag within subtrees of the currently selected candidate node, some embodiments may backtrack and check whether the previous tag had the multiplicity flag set (steps 320-322). Step 322 may comprise, for instance, parsing the previous tag of element ID 80 for the idx='*' attribute. When the multiplicity flag is not set, a step 318 may attempt to further backtrack to earlier tags. When none of the previous tags had a multiplicity flag, some embodiments may end the search, outputting a message indicating a failure to identify the runtime target (step 324).

When the multiplicity flag is set in one of the previously inspected tags of element ID 80, some embodiments return to step 308 to check whether there are any candidate nodes left of the list associated with the respective tag. Stated otherwise, when one search fails but the multiplicity flag is set, RPA robot 44 will try to search for the runtime target within subtrees of another candidate node identified in an earlier search iteration.

Looking back at the example described above in relation to FIG. 6 wherein two distinct nodes 72p and 72q of the runtime UI tree match a selected tag of element ID 80, the sequence of steps illustrated in FIG. 9 achieves the following outcome. When the multiplicity flag is not set within the selected tag, robot 44 may search within a subtree of one of the matching nodes (say, node 72p), fail to find the runtime target, and quit. In contrast, when the multiplicity flag is set, robot 44 may identify both nodes 72p and 72q as potential candidates for further investigation. In response to failing to find the runtime target under node 72p, robot 44 may continue searching within subtrees of node 72q, and successfully identify runtime target 72s.

Figure 10:
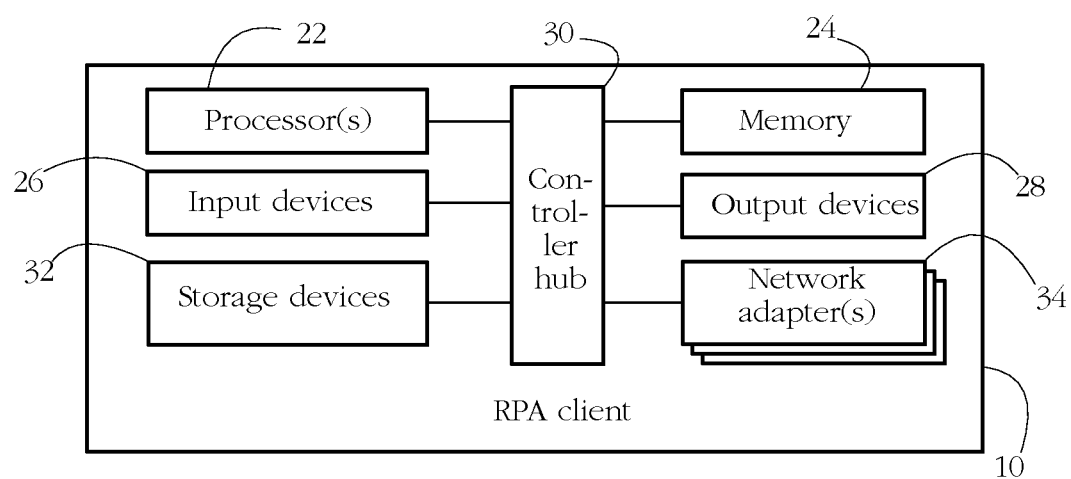
FIG. 10 illustrates an exemplary embodiment of a computing device configured to carry out methods described herein.

FIG. 10 shows an exemplary hardware configuration of a computing device programmed to execute some of the methods described herein. The respective computing device may represent any of RPA clients 10a-e in FIG. 1, for instance a personal computer as illustrated in FIG. 14. Other computing devices such as mobile telephones, tablet computers, and wearables may have slightly different configurations. Processor(s) 22 comprise a physical device (e.g. microprocessor, multi-core integrated circuit formed on a semiconductor substrate) configured to execute computational and/or logical operations with a set of signals and/or data. Such signals or data may be encoded and delivered to processor(s) 22 in the form of processor instructions, e.g., machine code. Processor(s) 22 may include a central processing unit (CPU) and/or an array of graphics processing units (GPU).

Memory unit 24 may comprise volatile computer-readable media (e.g. dynamic random-access memory—DRAM) storing data/signals/instruction encodings accessed or generated by processor(s) 22 in the course of carrying out operations. Input devices 26 may include computer keyboards, mice, and microphones, among others, including the respective hardware interfaces and/or adapters allowing a user to introduce data and/or instructions into RPA client 10. Output devices 28 may include display devices such as monitors and speakers among others, as well as hardware interfaces/adapters such as graphic cards, enabling the respective computing device to communicate data to a user. In some embodiments, input and output devices 26-28 share a common piece of hardware (e.g., a touch screen). Storage devices 32 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 34 enable the respective computing device to connect to an electronic communication network (e.g., networks 12 and 14 in FIG. 1) and/or to other devices/computer systems.

Controller hub 30 generically represents the plurality of system, peripheral, and/or chipset buses, and/or all other circuitry enabling the communication between processor(s) 22 and the rest of the hardware components of RPA client 10. For instance, controller hub 30 may comprise a memory controller, an input/output (I/O) controller, and an interrupt controller. Depending on hardware manufacturer, some such controllers may be incorporated into a single integrated circuit, and/or may be integrated with processor(s) 22. In another example, controller hub 30 may comprise a northbridge connecting processor 22 to memory 24, and/or a southbridge connecting processor 22 to devices 26, 28, 32, and 34.

It will also be apparent to one of ordinary skill in the art that aspects of the invention, as described above, may be implemented in various forms of software, firmware, and hardware, or a combination therof. For example, certain portions of the invention may be described as specialized hardware logic that performs one or more functions. This specialized logic may include an application-specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described above facilitate RPA operations by improving the automatic identification of activity targets, i.e., user interface elements acted upon by robotic software. When designing robotic software (a stage of automation commonly known as design-time), the RPA developer invokes an instance of the target UI and indicates a target element and an activity to be performed on the respective target element. For instance, the developer may indicate a button of the target UI and configure the robot to click on the respective button. In another example, the developer may indicate an input field and configure the robot to type some text into the respective input field. In yet another example, the developer may indicate a text box of the user interface and configured the robot to grab the content of the respective text box. The resulting robot code may include an indicator of the target element and an indicator of the respective activity. The robot code may then be distributed to RPA clients.

In another stage of automation commonly known as runtime, a client machine may execute the respective robot, which may attempt to interact with another, client-side instance of the target UI. To perform the activity indicated at design-time, the robot may have to reliably identify a runtime instance of the target element, i.e., identify the respective button, input field, etc. within the client-side UI. Target identification poses substantial technical problems, for at least the following reasons. First, in typical RPA applications the target user interface (e.g., an e-commerce webpage, an accounting interface, etc.) is developed and maintained independently of the robot designed to interact with the respective interface. Second, in many cases the target UI is proprietary, so RPA developers may not have a full understanding of its details and inner workings. Third, the runtime UI executes on a different machine, operated by a different user and having a different software context than the design-time machine. In view of the above reasons, the robot may be confronted with situations and scenarios which were not foreseen during robot design. For instance, the content and/or appearance of the target UI may change between design time and runtime. The user and/or other software executing concurrently with the runtime UI may interact with the runtime UI in unexpected ways (e.g., popup windows, new UI elements may appear, the user may activate additional functionality and/or hide some parts of the target UI, etc.) In another example, the client machine may unexpectedly have several instances of the target UI executing concurrently, etc.

Successful RPA may depend upon a robust method of identifying an activity target, method which is relatively insensitive to variations in the design of the target user interface and also capable of adapting to unforeseen runtime situations. Last but not least, RPA would ideally not require its designers to have extensive knowledge of computer programming, user interfaces, etc.

Some conventional RPA systems identify a runtime target by attempting to find an element of the runtime UI that exactly matches an element ID of the design-time target element. The element ID is specified in the source code or data structure underlying the respective user interface (for instance, the HTML code that specifies the appearance and content of a webpage.) Such searches may amount to searching for a node within a tree representation of the runtime UI, the node matching all design-time properties of the target element. Tree searches have the advantages of speed and ease of use. However, tree searches may fail in situations where there are multiple distinct nodes that match a subset of the properties of the design-time target.

In one example, the client machine may have multiple GUI windows with the same properties (e.g., same software application, same window name) opened concurrently, but the runtime target element can only be found in one of the respective windows. Such a situation occurs quite frequently in modern browsers for instance, wherein users often keep multiple browser tabs open simultaneously. Another example of this situation may occur when all popup windows of a running application are generated with the same window name, size, etc. A conventional robot designed to find the runtime target in a window with the respective window name may look within one such window (typically, the one currently in focus), and when the runtime target is not within the respective window, erroneously conclude that the runtime target is missing.

In another example, a banking application exposes a GUI showing two almost identical forms side by side. Both forms have the same programmatic name, class, and appearance, but only the one on the right of the screen has the input field targeted by the RPA robot. A conventional robot searching the GUI tree will successfully find the first (left) form having the desired properties. However, when the robot does not find the target input field within the respective form, it may again fail to accomplish its automation task.

In contrast to such conventional approaches, in some embodiments of the present invention the robot is endowed with a configuration option (e.g., a multiplicity flag) which, when set, instructs the robot to search through multiple instances of an object that has the required properties. Using the first example above, some embodiments are configured to search all windows having the required window name, i.e., when the runtime target cannot be found in one window, the search will continue in another window until eventually the runtime target is found. In the other example above, some embodiments may search for the target input field in both forms having the required name, class, and appearance.

In some embodiments, the multiplicity flag may be attached to selected node(s) of a UI tree of the design-time UI, for instance by adding a specific attribute-value pair to an existing set of attribute-value pairs characterizing the respective node. Attaching the flag to a selected node instructs the robot that there may be multiple instances of the respective node within the runtime UI, and further causes the robot to search for the to runtime target within all such instances. Searching within a node may comprise searching a subtree of the respective node. The multiplicity flag may be activated for multiple nodes simultaneously.

Setting the multiplicity flag may be achieved in various ways. The robot designer may write the respective flag (e.g., an attribute-value pair such as idx='*') directly into the code of the tag representing the selected node. Alternatively, some embodiments may expose a robot configuration GUI allowing a user to use a point-and-click method to set the multiplicity flag. In one such example, the GUI enables the designer to select a node of the target UI and further exposes a user input (e.g., checkbox or toggle switch) enabling the designer to activate the multiplicity flag for the respective node. The script authoring application may then automatically write the multiplicity flag into the code of the robot. Such embodiments facilitate robot design by not requiring the designer to have an advanced knowledge of coding or interface design.

It will be clear to one skilled in the art that the above embodiments may be altered in many ways without departing from the scope of the invention. Accordingly, the scope of the invention should be determined by the following claims and their legal equivalents.

The invention claimed is:

1. A method comprising employing at least one hardware processor of a computer system to:
in response to receiving a robotic process automation (RPA) script indicating a target element of a target user interface (UI), automatically identify a runtime instance of the target element within a runtime UI exposed by the computer system; and
automatically carry out an operation that reproduces a result of an interaction of a human operator with the runtime instance of the target element, the operation determined according to the RPA script;
wherein the RPA script specifies the target element as being a descendant of a selected node of a UI tree representation of the target UI; and
wherein automatically identifying the runtime instance of the target element comprises:
determining according to the RPA script whether a multiplicity flag is set,
in response, if the multiplicity flag is set, searching for the runtime instance of the target element within descendants of multiple instances of the selected node found within the runtime UI, and if the multiplicity flag is not set, searching for the runtime instance of the target element within descendants of a single instance of the selected node found within the runtime UI.

2. The method of claim 1, wherein automatically identifying the runtime instance of the target element comprises, when the multiplicity flag is set:
identifying an instance of the selected node within the runtime UI,
in response to a failure to identify the runtime instance of the target element among descendants of the instance of the selected node, identifying another instance of the selected node within the runtime UI, and
searching for the runtime instance of the target element within descendants of the other instance of the selected node.

3. The method of 1, wherein:
the RPA script indicates the target element via an element ID comprising a plurality of attribute-value pairs collectively characterizing the target element;
the multiplicity flag comprises a selected attribute-value pair of the element ID; and
wherein the method comprises determining whether the multiplicity flag is set according to a value of an attribute of the selected attribute-value pair.

4. The method of claim 3, wherein the value indicates how many instances of the selected node to search for the runtime instance of the target element.

5. The method of claim 3, wherein:
the plurality of attribute-value pairs comprises a first set of attribute-value pairs characterizing the selected node and a second set of attribute-value pairs characterizing descendants of the selected node; and
wherein automatically identifying the runtime instance of the target element comprises:
searching the runtime UI for a candidate node exactly matching the first set of attribute-value pairs, and
in response to identifying the candidate node, searching among descendants of the candidate node for another node exactly matching the second set of attribute-value pairs.

6. The method of claim 5, wherein the multiplicity flag is included within the first set of attribute-value pairs characterizing the selected node.

7. The method of claim 1, wherein:
the selected node comprises a form exposed by the target UI;
the target element comprises a field of the form; and
the interaction comprises filling in the field.

8. The method of claim 1, wherein:
the selected node comprises a UI menu exposed by the target UI;
the target element comprises a menu item of the UI menu; and
the interaction comprises selecting the menu item.

9. The method of claim 1, wherein:
the selected node comprises a document exposed by the target UI;
the target element comprises a section of the document; and
the interaction comprises copying a content of the section.

10. A computer system comprising at least one hardware processor configured to:
in response to receiving a robotic process automation (RPA) script indicating a target element of a target user interface (UI), automatically identify a runtime instance of the target element within a runtime UI exposed by the computer system; and
automatically carry out an operation that reproduces a result of an interaction of a human operator with the runtime instance of the target element, the operation determined according to the RPA script;
wherein the RPA script specifies the target element as being a descendant of a selected node of a UI tree representation of the target UI; and
wherein automatically identifying the runtime instance of the target element comprises:
determining according to the RPA script whether a multiplicity flag is set,
in response, if the multiplicity flag is set, searching for the runtime instance of the target element within descendants of multiple instances of the selected node found within the runtime UI, and
if the multiplicity flag is not set, searching for the runtime instance of the target element within descendants of a single instance of the selected node found within the runtime UI.

11. The computer system of claim 10, wherein automatically identifying the runtime instance of the target element comprises, when the multiplicity flag is set:
identifying an instance of the selected node within the runtime UI,
in response to a failure to identify the runtime instance of the target element among descendants of the instance of the selected node, identifying another instance of the selected node within the runtime UI, and
searching for the runtime instance of the target element within descendants of the other instance of the selected node.

12. The computer system of claim 10, wherein:
the RPA script indicates the target element via an element ID comprising a plurality of attribute-value pairs collectively characterizing the target element;
the multiplicity flag comprises a selected attribute-value pair of the element ID; and
wherein the method comprises determining whether the multiplicity flag is set according to a value of an attribute of the selected attribute-value pair.

13. The computer system of claim 12, wherein the value indicates how many instances of the selected node to search for the runtime instance of the target element.

14. The computer system of claim 12, wherein:
the plurality of attribute-value pairs comprises a first set of attribute-value pairs characterizing the selected node and a second set of attribute-value pairs characterizing descendants of the selected node; and
wherein automatically identifying the runtime instance of the target element comprises:
searching the runtime UI for a candidate node exactly matching the first set of attribute-value pairs, and
in response to identifying the candidate node, searching for the runtime instance of the target node among descendants of the candidate node according to the second set of attribute-value pairs.

15. The computer system of claim 14, wherein the multiplicity flag is included within the first set of attribute-value pairs characterizing the selected node.

16. The computer system of claim 10, wherein:
the selected node comprises a form exposed by the target UI;
the target element comprises a field of the form; and
the interaction comprises filling in the field.

17. The computer system of claim 10, wherein:
the selected node comprises a UI menu exposed by the target UI;
the target element comprises a menu item of the UI menu; and
the interaction comprises selecting the menu item.

18. The computer system of claim 10, wherein:
the selected node comprises a document exposed by the target UI;
the target element comprises a section of the document; and
the interaction comprises copying a content of the section.

19. A non-transitory computer-readable medium storing instructions which, when executed by at least one hardware processor of a computer system, cause the computer system to:
   in response to receiving a robotic process automation (RPA) script indicating a target element of a target user interface (UI), automatically identify a runtime instance of the target element within a runtime UI exposed by the computer system; and
   automatically carry out an operation that reproduces a result of an interaction of a human operator with the runtime instance of the target element, the operation determined according to the RPA script;
   wherein the RPA script specifies the target element as being a descendant of a selected node of a UI tree representation of the target UI; and
   wherein automatically identifying the runtime instance of the target element comprises:
      determining according to the RPA script whether a multiplicity flag is set,
      in response, if the multiplicity flag is set, searching for the runtime instance of the target element within descendants of multiple instances of the selected node found within the runtime UI, and
      if the multiplicity flag is not set, searching for the runtime instance of the target element within descendants of a single instance of the selected node found within the runtime UI.

20. A computer system comprising at least one hardware processor configured to:
   expose a robot design interface to a user, the robot design interface configured to receive a user input indicating a target element of a target user interface (UI) and to expose a control enabling the user to set a multiplicity flag associated with the target element; and
   output a robotic process automation (RPA) script comprising a specification of an RPA robot configured to carry out an operation that reproduces a result of an interaction of a human operator with a runtime instance of the target element, the RPA script including the multiplicity flag;
   wherein executing the RPA script on an RPA client causes the RPA client to:
      determine according to the RPA script whether the multiplicity flag is set,
      in response, if the multiplicity flag is set, search for the runtime instance of the target element within descendants of multiple instances of the selected node found within the runtime UI, and
      if the multiplicity flag is not set, search for the runtime instance of the target element within descendants of a single instance of the selected node found within the runtime UI.

\* \* \* \* \*